Figure 1:
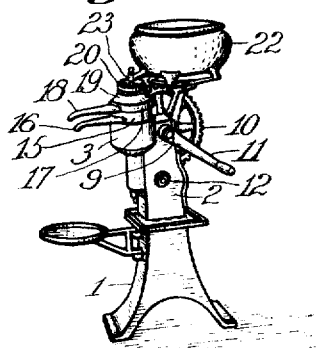

H. A. RIGGS.
CENTRIFUGAL SELF BALANCING SEPARATOR OR CLARIFIER.
APPLICATION FILED JAN. 7, 1916.

1,242,866.

Patented Oct. 9, 1917.
2 SHEETS—SHEET 1.

WITNESSES:
J. H. Gardner
M. E. Sparrow

INVENTOR:
Horace A. Riggs,
BY
E. T. Silvius,
ATTORNEY.

UNITED STATES PATENT OFFICE.

HORACE A. RIGGS, OF INDIANAPOLIS, INDIANA.

CENTRIFUGAL SELF-BALANCING SEPARATOR OR CLARIFIER.

1,242,866.     Specification of Letters Patent.     Patented Oct. 9, 1917.

Application filed January 7, 1916. Serial No. 70,762.

*To all whom it may concern:*

Be it known that I, HORACE A. RIGGS, a citizen of the United States, residing at Indianapolis, in the county of Marion and State of Indiana, have invented a new and useful Improvement in Centrifugal Self-Balancing Separators or Clarifiers, of which the following is a specification, reference being had to the accompanying drawings and to the letters and figures of reference marked thereon.

This invention relates to centrifugal separators that are designed for separating the butter fat from milk, and which, with slight modification in structure, are adapted to be used as clarifiers, the invention having reference more particularly to a type of separating machine having separating apparatus removably mounted on and rotated by a vertical shaft; the invention relating also and more especially to structural improvements, in machines of the above-mentioned type, involving the mounting and operation of the separating apparatus, to overcome or eliminate the mechanical deficiencies inherent in machines hitherto produced.

In order to obtain close separation of butter fat from milk by centrifugal force, it is necessary to revolve the bowl or separating device at speeds ranging approximately from seven-thousand to twelve-thousand revolutions per minute, depending upon the design, construction, and interior arrangement of parts of the respective bowls used in the various types of machines in general use. The skimming efficiency of the different types of separators heretofore produced is greatly impaired if the bowls thereof are permitted to "get out of balance," as a certain defect is termed, which condition may result from a fall or shock when disuniting the parts of the bowl for cleaning purposes, or may naturally follow the continued use of the machine as the different parts or contents of the bowl more firmly or compactly settle into position, thus entailing enormous waste of butter fat or necessitating the return of the bowl to the factory for re-balancing at great expense to the owner. The skimming efficiency of the common types of bowls is also impaired if the machines are not set absolutely level, as otherwise excessive vibration of the bowl and loss of butter fat would result. In order to reduce vibration of the bowl as much as possible in an effort to avoid such loss, it is therefore necessary to observe that the bowl be not only carefully balanced when manufactured, but that the separator (or clarifier) be set in an absolutely vertical position when ready for use. Even when the above-mentioned conditions have been observed and remedial precautions taken, vibrations of the bowl in the common types of separators are not entirely overcome, especially when the machine is operated by hand and consequently the power applied unevenly.

As it has previously been found impossible to meet or overcome vibrations of the bowl (or skimming device) under the various conditions following the unsatisfactory use of said machines (entailing loss of butter fat in the skim milk), numerous devices have been produced and commonly termed "flexible" or "spring-supported" neck bearings, set in the frame of the machines, through which the bowl spindle or bowl-supporting and driving shaft is inserted, with the purpose of cushioning or reducing the jar of the bowl and making the vibrations less noticeable to the operator, with but little, if any, increase in bowl-skimming efficiency.

Inasmuch as the bowls in the common types of separating machines are in effect pivoted at the lower end of the bowl spindle, or bowl-supporting and driving shaft, (whether the shaft is formed as a part or lower extension of the bowl, or closely fitted therein,) when pressure is applied on the driving crank and through the gears, the bowl is pushed slightly off its pivoted center, as a result of the yielding of the spring-supported or flexible neck bearing above referred to which inaccurately guides the bowl spindle, by the thrust or impinge of the intermediate gear against the bowl spindle.

In order to avoid the numerous difficulties and mechanical imperfections enumerated above, the object being to attain improved results in operation, I have provided an improved and self-balancing bowl or separating apparatus in cream separators or clarifiers by yieldingly supporting such bowl in a novel manner on the upper end of the bowl spindle or driving shaft, the supporting point being above the center of gravity of said bowl, and so that the major portion of weight of the bowl is loosely suspended below the supporting point, so that the force of gravity insures balancing, steadiness, and efficiency of operation of the bowl at all times. This construction also permits the use of the desired rigid or fixed bearings for the bowl spindle and prevents excessive wear of the gears by holding the gears in proper mesh when operating, which result cannot be obtained when the bowl spindle is mounted in a yielding upper bearing allowing the gears to go out of the pitch line of mesh and cramping the spindle in its lower bearing, further causing the machine to run hard.

An object of the invention also is to improve the construction of the separating apparatus so as to induce sanitary practices in the operation and care of machines designed for separating butter fat from milk.

With the above-mentioned, and other objects which will hereinafter clearly appear, in view, the invention consists essentially and more specifically in providing a gravity-balancing centrifugal separating apparatus structure having a non-yielding supporting and operating shaft; the invention consisting also further in the novel parts, and in the combinations and arrangements of parts, as hereinafter particularly described and further defined in the appended claims.

Figure 2:
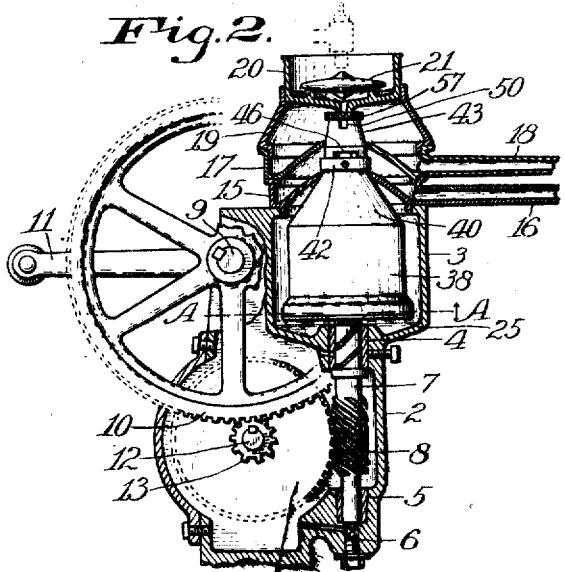
Figure 3:
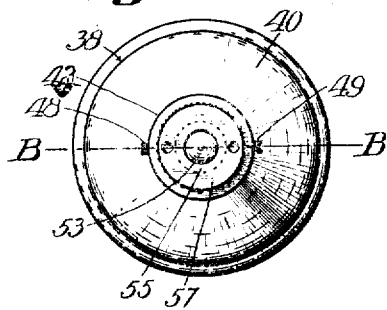
Figure 4:
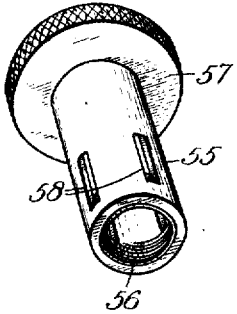
Figure 5:
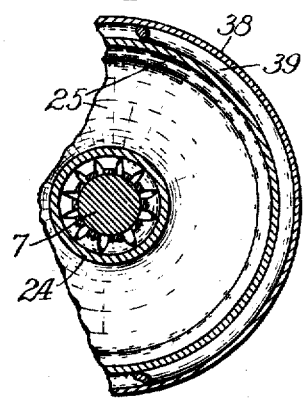
Figure 6:
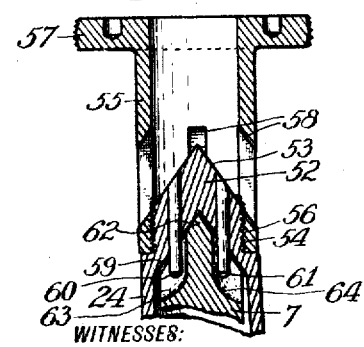
Figure 7:

Referring to the drawings, Figure 1 is a perspective view of a popular type of cream separator to which the invention is applied to indicate the character of apparatus with which the invention is most advantageously applied; Fig. 2 is a fragmentary elevation of the cream separator partially in section; Fig. 3 is a top plan of the bowl or separator device of the machine; Fig. 4 is a perspective view of a novel cap and feed-tube adapted for securing the different parts of the bowl together; Fig. 5 is a fragmentary section approximately on the line A A on Fig. 2 looking upward; Fig. 6 is a central section of the cap and feed-tube connected to the bowl center of which the upper portion is shown as being mounted on the upper portion of the supporting shaft of the bowl or separating apparatus; Fig. 7 is a top plan of the shaft; Fig. 8 is a vertical section on the line B B on Fig. 3; Fig. 9 is a fragmentary section also on the line B B; Fig. 10 is a fragmentary section approximately on the line C C on Fig. 8 looking upward; Fig. 11 is a perspective view of the upper or neck portion of the separator shell; Fig. 12 is a fragmentary section, as on the line B B but slightly modified to adapt the apparatus for use as a clarifier of liquids; and, Fig. 13 is a fragmentary section also on the line B B, but slightly modified as to details.

Similar reference characters on the different figures of the drawings indicate corresponding elements or features of construction herein referred to.

The machine illustrated for descriptive purposes comprises a base or stand 1 on which is a main frame 2 supporting a casing 3 and a stationary journal box 4 at the bottom of the casing, and also another stationary journal box 5 in a lower position, a shaft-end bearing 6 being supported by the frame below the lower box. A separator shaft 7 is rotatably mounted in the journal boxes 4 and 5 with its lower end upon the bearing 6, and it has spiral gear teeth 8 thereon between the journal boxes. A main shaft 9 is rotatably mounted in the main frame and has a gear wheel 10 secured thereto, and when the machine is designed to be operated by hand the shaft 9 is provided with a crank 11. A counter-shaft 12 is mounted also in the frame and has a pinion 13 and a gear wheel 14 secured thereto, the pinion being in mesh with the wheel 10, the wheel 14 being in mesh with the gear teeth 8 of the shaft 7. The shaft 7 being mounted in firmly supported journal boxes is not vibrated by the driving action of the wheel 14. A pan 15 is removably supported upon the casing 3 to receive the skimmed milk and has a spout 16 thereon, the pan removably supporting another pan 17 to receive the cream separated from the milk and discharge it through a spout 18 connected to the pan. The pan 17 has a removable cover 19 which supports a feed-cup 20 usually having a float 21 therein to automatically control the flow of the milk from a vessel 22 supported on the frame and having a faucet 23 arranged above the float, the latter features being well known.

The separating apparatus comprises a hollow bowl center 24 of improved form and larger than the shaft 7 in diameter, so that when the shaft is supporting the bowl and not supported in exactly vertical position the bowl is not forced out of balance or level position. Preferably the center is slightly tapered so as to have an inclined exterior presented to the liquid to be acted upon.

An apparatus of the character set forth comprises various well-known elements, as a bowl bottom 25 fixed to the bowl center, a shell, separating disks, and variously formed passages for the liquid.

In the present case an improved distributing-tube 26 is provided that is greater in diameter than the bowl center 24 and extends about the center from the bowl bottom upward and to a plane above the center, the lower portion of the tube having a lining 27 therein that is in contact with the bowl center for centering the tube. The upper end of the tube has a contracted neck 28. The main portion of the tube has vertical slots 29 in its wall, and also a radial wing 30 on one side and a relatively broader wing 31 on the opposite side of each slot. A suitable number of separating-disks 32 are superimposed upon the bottom of the bowl in spaced apart arrangement and extend outward from the wings 30, being slotted to receive the wings 31. The uppermost one of the disks supports a cover 33 having a neck 34 that is greater in diameter and extends about the tube 26 above the disks, the neck of the cover preferably having a tapered upper portion 35 in the upper end of which are slots 36 and 37 for the escape of liquid. The shell of the bowl comprises a cylindrical portion 38 having connection with a packing-ring 39 supported by the bottom of the bowl, and a conical top portion 40 provided with spacers 41 that extend to the cover 33. The shell has a neck 42 having a tapered upper portion 43 that embraces the tapered portion 35. In some cases the neck 42 has a relatively thicker wall than the remaining portions of the shell, the inside of the wall of the neck having vertical channels 44 and 45 that communicate with the space under the conical portion 40 of the shell and extend upward to slots 46 and 47 respectively that are formed in the wall for the escape of liquid. Regulator plugs 48 and 49 are screwed into the neck 42 for the purpose of partially closing the channels 44 and 45 respectively. The top end of the tapered portion 43 of the neck has slots 50 and 51 therein that are in register with the slots 36 and 37, respectively.

In order to improve the internal structure of the bowl, more especially in the interest of sanitation, the bowl center 24 is provided with a closure head 52 on its top that has a conical top face 53. The head is provided with external screw-threads 54 to which a novel locking device is connected, the device comprising a feed-tube 55 having internal screw-threads 56 for engaging the screw-threads 54, the tube being inserted in the contracted neck portion 28 of the distributing-tube in contact therewith and having a cap flange 57 thereon that extends over and in contact with the tops of the neck portions 28, 35 and 43, thus normally locking the different parts of the bowl together and permitting convenient disuniting of the parts for cleansing purposes. The tube 55 has apertures 58 therein adjacent to the inclined top 53 which evenly divides the liquid to the apertures when received into the tube.

In order to pivotally support the bowl or separator apparatus in an improved manner so that it shall be free to hang in level position whether its supporting shaft is exactly vertical or is slightly inclined, the under side of the head 52 has a socket 59 therein which preferably is conical in contour so as to be self-centered on its support, and two driving pins 60 and 61 are fixed to the head and extend downward into the socket. The separator shaft 7, which is sufficiently long to extend upward in the bowl center 24 to the head 52, the latter being located adjacent to the higher portion of the uppermost one of the separator disks, has a conical top 62, so that a pivotal centering point is provided, the upper portion of the shaft having recesses 63 and 64 therein adjacent to the periphery of the shaft to receive the driving-pins 60 and 61. The driving devices, however, that enable the shaft to rotate the apparatus are not of necessity constructed exactly as described.

In some cases a cushion or shock-absorber may be desired within the base of the bowl to prevent unnecessary oscillation of the bowl on its shaft, or to absorb the shock in case the bowl is accidentally thrust sidewise, and such cushioning devices may suitably comprise a collar 65 from which spring-fingers 66 and 66' extend, the collar constituting the middle portion of a plurality of bow-shaped springs connected together by the collar, the collar extending about the shaft and in contact with the inside of the bowl center 24, the ends of the spring-fingers being in contact with the shaft which is provided with shoulders 67 and 68 to keep the springs in proper place near the lower end of the bowl center.

In some cases the cushion may be composed of a collar 69 placed in contact with the shaft and having spring-fingers 70 and 70' thereon extending to the inside of the bowl center 24, the latter having shoulders 71 and 72 for holding the springs in proper position in the lower portion of the bowl center.

When the separator is not designed for separating cream from whole milk, but is desired to be used for clarifying purposes, the neck 42 is devoid of the outlet channels, and the neck 34 has apertures 73 and 74 therein so as to form passages from the space under the conical portion 40 of the shell to the space between the tube 26 and the neck 35, so that all the liquid may escape together through the apertures 50 and 51 while the sedimentary matter gravitates to the bottom of the bowl.

The machine, as will be understood, is set so that the separator shaft 7 shall be upright, but in most cases in practice the user is unable to secure accurate perpendicularity of the separator shaft but can only approximate such arrangement. In the present case while the shaft is rotated, although in slightly inclined position, the separator bowl constantly finds its level automatically on its pivotal support, through the force of gravity, with the result that uniform distribution of the liquid in the separator is attained and the loss of butter fat is avoided. In operation, as will be understood, the whole milk is fed into the tube 55, deflected evenly through the apertures 58 to the inside of the distributing-tube 26, and thence through the slots 29, the separation occurring between the separator disks. The butter fat or cream is forced out of the apertures 50 and 51 while the skimmed milk is forced through the channels 44 and 45 and the apertures 46 and 47. The thickness or richness of the cream may be varied by means of the plugs 48 and 49 which act as valves in the adjacent channels, as will be understood. It should be understood that the cushion between the separator bowl and its shaft is sufficiently weak to permit the loaded separator bowl to automatically adjust itself to balanced level position in operation.

Various features relating to the bowl structure, which may not be claimed herein, form the subject-matter of a divisional application for Letters Patent filed May 3, 1916, Serial Number 95,120.

Having thus described the invention, what is claimed as new is—

1. A centrifugal separator or clarifier including a rotatable upright shaft, and a separator bowl pivotally mounted directly upon and loosely clutched to the shaft to be rotated thereby.

2. A centrifugal cream separator including an upright shaft, a separating device pivotally mounted directly on the shaft, and a freely-yieldable cushioning device interposed between the shaft and the separating device.

3. A centrifugal separator or clarifier including an upright rotatable shaft, a separating device pivotally mounted directly on the shaft to be rotated thereby, and a freely-yieldable spring-cushion interposed between the shaft and the separating device.

4. A centrifugal separator or clarifier including an upright shaft rotatably supported to be laterally non-yielding, and a separator bowl having a pivotal support directly upon and loosely clutched to the shaft, whereby the bowl is balanced while permitting inclination of the shaft.

5. A centrifugal separator or clarifier including a shaft, a pivotally supported and rotatable separating device mounted directly on the shaft, and an elastic bearing supported within the base portion of the device and yieldingly resisting oscillation of the device laterally with respect to its axis of rotation.

6. A centrifugal separator or clarifier including an upright supported rotatable shaft having a conical top, a separator bowl having a centering bearing supported directly upon the central extremity of the conical top, and means enabling the shaft to rotate the bowl.

7. A centrifugal separator or clarifier including an upright rotatable shaft, and a separating apparatus having a universal-joint balancing and coupling connection direct with the top of the shaft for rotating the apparatus by the shaft and permitting free balancing of the apparatus.

8. A centrifugal separator or clarifier including a separating device with conical disks therein, a rotatable upright shaft for supporting the device, and means for automatically balancing the device directly upon the shaft adjacent to the top of the uppermost disk and provided with connecting means enabling the shaft to rotate the device.

9. A centrifugal separator or clarifier including a separator bowl having a center-bearing above the center of gravity thereof, and a supporting shaft extending upward in the bowl free from contact therewith to and directly supporting the center-bearing, and means loosely clutching the center-bearing to the shaft to permit inclination of the shaft and gravity-balancing of the bowl.

10. A centrifugal separator or clarifier including a separating device provided with a central pivotal support arranged above the center of gravity of the device and enabling the device to be balanced by gravitation, means adjacent to the pivotal supports for rotating the device, and a yielding appliance coöperating with the separating device and in direct contact therewith to resist oscillation of the device on its pivotal support.

11. A centrifugal separator or clarifier including a separator bowl having a centering bearing device integral with the bowl center and bowl base, and a supporting shaft extending upward and freely in the bowl to the bearing device, the bearing device being supported directly on the shaft to balance the bowl and permitting inclination of the shaft relatively to the balanced bowl.

12. A centrifugal separator or clarifier including a frame, a shaft rotatably supported non-yieldingly by the frame, a separating device provided with a pointed bearing connection with the shaft directly supporting the device in balanced position above the center of gravity of the device and means in proximity to the pointed bearing connection enabling the shaft to rotate the separating device.

13. A centrifugal separator or clarifier including an upright rotatable shaft, a separating apparatus having a universally-jointed pivotal central connection direct with the shaft to bodily support the apparatus above its center of gravity whereby the apparatus is enabled to rotate in balanced position on inclination of the shaft, and means for removably connecting the apparatus with the shaft to rotate the apparatus.

14. A centrifugal separator or clarifier including an upright supported rotatable shaft, a separating device supported above its center of gravity on and removably clutched direct to the shaft and having clearance space permitting oscillation of the device relatively to its axis of rotation to prevent transmission of lateral vibration from the shaft to the device below its point of support, the space permitting inclination of the shaft and gravity-balancing of the separating device, and a driving gear engaging the shaft.

15. A centrifugal separator or clarifier including an upright supported rotatable shaft having a tapering point on its top, the top of the shaft being provided with a connecting device, and a separator bowl having a supporting member therein provided with a centering socket supported on said point, the member being provided with a connecting device arranged in the socket thereof that is engaged by the connecting device direct to the shaft to enable the shaft to rotate the bowl, such pivoted connection directly between the shaft and the bowl member being situate above the center of gravity of the bowl.

16. The combination of a separating or clarifying device, an upright shaft, means for pivotally mounting the device direct to the shaft above the center of gravity of the device and gear mechanism for rotating the shaft and separating device, substantially as set forth.

17. The combination of a separating or clarifying device of the conical disk type, a rotatable unitary shaft for supporting said device and in contact therewith above the center of gravity of the device, means for automatically balancing said device upon said shaft, means for guiding and preventing lateral movement of said shaft, and a driving gear engaging the shaft.

18. The combination of a separating or clarifying device, a rotatable shaft, a spring mounted directly upon said shaft, and a driving gear engaging the shaft, substantially as set forth.

19. The combination of a separating or clarifying device, a rotatable shaft centrally supporting said device above its center of gravity and a spring interposed between said separating device and shaft and in direct contact with each, substantially as set forth.

20. The combination of a separating or clarifying device, a rotatable shaft having direct contact with and centrally supporting said device, and a spring having direct contact with said device and said shaft, substantially as set forth.

21. The combination of an upright shaft, a separating or clarifying device loosely mounted upon the shaft, a spring or shock absorber interposed between said device and shaft and in direct contact therewith, and a driving gear engaging the shaft, substantially as set forth.

22. The combination of a pivotally mounted separating or clarifying device and a flexible bearing mounted within the base portion of said separating or clarifying device and in direct contact therewith, and gear mechanism for operating the device, substantially as set forth.

23. The combination of a pivotally mounted bowl, a flexible bearing within the base portion of the bowl and situate within direct contact therewith, a rotatable shaft directly clutched to the bowl, and clearance between said bowl and shaft to allow the bowl to automatically center and reduce vibration when operating, substantially as set forth.

24. The combination of an upright shaft and a separating or clarifying device pivotably mounted on said shaft and in positive and direct engagement therewith, said pivotal connection being above the center of gravity of said separating or clarifying device, and clearance allowed between the separating device and shaft to permit the bowl to automatically center when operating, substantially as set forth.

25. In a centrifugal separator or clarifier, the combination of an upright shaft having a conical top, the top having two recesses therein adjacent to the periphery of the shaft, and a separator bowl having a hollow center extending about the shaft, the center being greater in diameter than the shaft to afford space for pivotal movement of the shaft in the center and having a closure head thereon provided in its under side with a bearing socket having a conical contour and receiving the conical top of the shaft, the apex of the conical top pivotally supporting said head, said head having two driving pins fixed thereto in said socket and extending removably into said two recesses respectively.

26. In a centrifugal separator or clarifier, the combination of an upright shaft, a separator bowl having a hollow center that is greater in diameter than the shaft, the center being pivotally supported directly upon the top of the shaft and extending about the shaft, and a plurality of bow-shaped springs connected together and collectively extending about the shaft in direct contact therewith and also in direct contact with the inside of the lower portion of the bowl center.

27. In a cream separator or clarifier, a cone connection directly between the top of the supporting shaft and bowl center, clearance between the connecting members to permit the bowl to rise slightly against the inclined sides of the cone connection to avoid vibrations of the shaft being imparted to the bowl or transversely, vibrations of the bowl being imparted to the shaft.

28. In a cream separator or clarifier, a cone connection provided with positive means for coupling the shaft direct to the bowl center, clearance between the bowl and shaft to enable the bowl to revolve on an axis independent of the axis of the shaft, and a flexible spring cushion bearing directly against the shaft and bowl center to reduce the oscillations of the bowl.

29. In a cream separator or clarifier, a cone connection directly between the shaft and bowl center, means for locking the shaft and bowl center in positive engagement above the center of gravity of the bowl, and a flexible spring engaging both shaft and bowl center co-acting with gravity to balance the bowl.

30. In a centrifugal self-balancing separator or clarifier, the combination of an approximately vertical shaft rotatably supported to be laterally non-yielding, and a separator bowl pivotally mounted directly upon and loosely clutched to the shaft to be rotated thereby.

31. In a centrifugal self-balancing separator or clarifier, the combination of an approximately vertical rotatable shaft having a laterally non-yielding axis, a separating device pivotally mounted directly on the shaft, and a freely-yieldable cushioning device interposed between the shaft and the separating device.

32. In a centrifugal self-balancing separator or clarifier, the combination of an approximately vertical rotatable shaft, rigid bearings guiding the shaft, a separating device pivotally mounted directly on the shaft to be rotated thereby, and a freely-yieldable spring-cushion interposed between the shaft and the separating device adjacent to the rigid bearings.

33. In a centrifugal self-balancing separator or clarifier, the combination of an approximately vertical shaft rotatably supported to be laterally non-yielding, and a separator bowl of the conical disk type having a pivotal support directly upon and loosely clutched to the shaft, whereby the bowl is balanced on the laterally non-yielding shaft while permitting inclination of the bowl.

34. In a centrifugal self-balancing separator or clarifier, the combination of an approximately vertical rotatably supported unitary shaft having a conical top, a rigid bearing guiding the shaft, a separator bowl having a centering bearing adjacent to its top and supported upon the conical top, and means enabling said shaft to rotate the bowl.

35. In a centrifugal self-balancing separator or clarifier, the combination of a separating device with conical disks therein, a rotatable unitary upright shaft for supporting the separating device, means for supporting and automatically balancing the separating device directly upon the shaft adjacent to the uppermost one of the disks, and connecting means enabling the shaft to rotate the device.

36. In a centrifugal self-balancing separator or clarifier, the combination of a frame, a shaft rotatably supported non-yieldingly by the frame, a separating device of the conical disk type provided adjacent to the uppermost one of the disks with a pointed bearing connection with the shaft directly supporting the device in balanced position, and means in proximity to the pointed bearing connection having freely separable engagement with the shaft and enabling the shaft to rotate the separating device.

37. In a centrifugal self-balancing separator or clarifier, the combination with a separating or clarifying device, and an upright rotatable shaft, of a rigid bearing guiding the shaft to be laterally non-yielding, means for pivotally and removably mounting the device direct on the shaft above the center of gravity of the device and having freely separable means enabling the shaft to rotate the device, and gear mechanism for rotating the shaft.

38. In a centrifugal self-balancing separator or clarifier, the combination of a separating or clarifying device of the conical disk type, a unitary rotatable shaft balancing and driving the device, a spring mounted directly on the shaft in connection with said device, and a driving gear for rotating the shaft.

39. In a centrifugal self-balancing separator or clarifier, the combination of an upright shaft, the top of the shaft having a central point, and a separating appliance comprising a hollow bowl center provided with a bearing portion having supporting contact with said point.

40. In a centrifugal self-balancing separator or clarifier, the combination of an upright shaft having a conical top, and a separating appliance comprising a hollow bowl center having a bearing portion that is conical in contour, the apex of the bearing portion having supporting contact with the apex of the conical top of the shaft.

41. In a centrifugal self-balancing separator or clarifier, the combination of a rigid bearing, an upright unitary shaft rotatably guided in the bearing and having a conical top provided with a centering point, a separating appliance comprising a hollow bowl center having a bearing portion in contact with said point, said bowl center extending downward continuously about said shaft approximately to said bearing, and an elastic bearing adjacent to said rigid bearing and between said shaft and said bowl center.

42. In a centrifugal self-balancing separator or clarifier, the combination of a sepator bowl comprising a conical top and a hollow bowl center extending upward approximately to the plane of the upper end of said top, said center having a center-bearing therein in proximity to the plane of said top, an integrally unitary rotatable shaft extending upward in the bowl center free from contact therewith to and supporting said center-bearing, and means loosely clutching said center-bearing to said shaft.

43. In a centrifugal self-balancing separator or clarifier, the combination of an upright rotatable shaft, the top of the shaft having a conical point, a rigid bearing guiding and preventing lateral movement of the shaft, and a hollow bowl center and separator disks thereon, the said center having a bearing portion arranged adjacent to the plane of the uppermost one of the separator disks, said bearing portion being seated directly upon said conical point and being freely removable therefrom, with means for loosely clutching said bowl center to said shaft.

44. In a centrifugal self-balancing separator or clarifier the combination of a unitary upright rotatable shaft, a rigid bearing guiding and preventing lateral movement of the shaft, a separating appliance of the conical disk type provided with a center-bearing approximately at the top of the uppermost one of the disks, said center-bearing being pivotally supported upon said shaft and permitting gravity-balancing of the separating appliance, and driving gearing connected with said shaft below said rigid bearing.

45. In a centrifugal self-balancing separator or clarifier, the combination of an upright shaft having a conical top, a separator bowl having a hollow center extending loosely about the shaft and provided with a closure head fixed to the center, the head being provided in its under side with a bearing socket having a conical contour and receiving the conical top of the shaft, the apex of the conical top pivotally supporting said head, and means coöperating with the shaft and the hollow center for yieldingly resisting pivotal movement of said head on the apex of said conical top.

46. In a centrifugal self-balancing separator or clarifier, the combination of a frame, a step bearing supported in the frame, a main bearing rigidly supported by the frame above the step bearing, a shaft rotatably supported on the step bearing and extending upward through the main bearing, the shaft being continuous and laterally non-flexible, a gear fixed to the shaft between said bearings, a separator bowl pivotally supported upon said shaft, and means arranged above and adjacent to said main bearing to yieldingly resist pivotal movement of the bowl on said shaft.

47. In a centrifugal self-balancing separator or clarifier, the combination of an upright rotatable shaft having a conical top and having also a recess in said top that extends to the periphery of the shaft, and a separator bowl having a hollow center loosely arranged on said shaft and pivotally supported removably on said conical top, the hollow center being provided therein with a projection normally extending into said recess.

In testimony whereof, I affix my signature in presence of two witnesses.

HORACE A. RIGGS.

Witnesses:
E. T. Shyius,
M. E. Sparrow.